US008710983B2

(12) United States Patent  
Malkowski (10) Patent No.: US 8,710,983 B2
(45) Date of Patent: Apr. 29, 2014

(54) INTELLIGENT SENSOR NETWORK (71) Applicant: Integrated Security Corporation, Novi, MI (US)

(72) Inventor: Bernard M. Malkowski, White Lake, MI (US)

(73) Assignee: Integrated Security Corporation, Novi, MI (US)

( * ) Notice: Subject to any disclaimer, the term of this patent is extended or adjusted under 35 U.S.C. 154(b) by 0 days.

(21) Appl. No.: 13/888,316

(22) Filed: May 6, 2013

(65) Prior Publication Data

US 2013/0335219 A1     Dec. 19, 2013

Related U.S. Application Data (60) Provisional application No. 61/643,773, filed on May 7, 2012.

(51) Int. Cl.
G08B 1/08     (2006.01)
G08B 13/00    (2006.01)
H04W 4/00     (2009.01)

(52) U.S. Cl.
USPC .............. 340/539.22; 340/539.1; 340/539.26; 340/541; 340/550; 340/565; 370/328

(58) Field of Classification Search
None
See application file for complete search history.

(56) References Cited

U.S. PATENT DOCUMENTS

| 4,321,592 A | 3/1982 | Crandall |
| 4,400,695 A | 8/1983 | Rittenbach |
| 4,562,428 A | 12/1985 | Harman |
| 4,613,848 A | 9/1986 | Watkins |
| 4,857,912 A | 8/1989 | Everett, Jr. et al. |
| 4,962,473 A | 10/1990 | Crain |
| 5,107,249 A | 4/1992 | Johnson |
| 5,202,661 A | 4/1993 | Everett |
| 5,398,057 A | 3/1995 | Tapp |
| 5,517,429 A | 5/1996 | Harrison |
| 5,576,972 A | 11/1996 | Harrison |
| 6,664,894 B2 | 12/2003 | Pakhomov |

(Continued)

FOREIGN PATENT DOCUMENTS

WO    WO 2007043040     4/2007

OTHER PUBLICATIONS

Wireless Sensor Networks for Human Intruder Detection; The SmartDetect Project Team, Indian Institute of Science, Bangalore, India (49pgs), May 14, 2010.

(Continued)

*Primary Examiner* — George Bugg
*Assistant Examiner* — Renee Dorsey
(74) *Attorney, Agent, or Firm* — Foley & Lardner LLP (57) ABSTRACT The present application describes a sensor network and method for monitoring and detecting intrusion activities in accordance with various illustrative embodiments. In one embodiment, a method includes receiving a first input from a first sensor at a first sensor node of a wireless ad hoc sensor network, and comparing the first input to a first predefined input threshold associated with an intrusion activity. The method also includes wirelessly communicating an indication of the intrusion activity to a gateway device via a second sensor node of the wireless ad hoc sensor network. The gateway device may include an interface between the wireless ad hoc sensor network and a user-interactive system configured to monitor the wireless ad hoc sensor network.

22 Claims, 7 Drawing Sheets

(56) References Cited

U.S. PATENT DOCUMENTS

| | | |
|---|---|---|
| 6,778,469 B1 | 8/2004 | McDonald |
| 6,937,151 B1 | 8/2005 | Tapanes |
| 7,154,391 B2 | 12/2006 | Maki |
| 7,154,392 B2 | 12/2006 | Rastegar |
| 7,161,483 B2 | 1/2007 | Chung |
| 7,218,217 B2 | 5/2007 | Adonailo |
| 7,519,242 B2 | 4/2009 | Tapanes |
| 7,535,355 B2 | 5/2009 | Barone |
| 7,624,448 B2 | 11/2009 | Coffman |
| 7,667,599 B2 | 2/2010 | Mainini et al. |
| 7,688,202 B1 | 3/2010 | Doyle et al. |
| 7,750,803 B2 | 7/2010 | Matsuhira |
| 7,868,812 B2 | 1/2011 | Huthoefer et al. |
| 7,902,977 B2 | 3/2011 | Howe |
| 7,925,660 B2 | 4/2011 | Dieberger |
| 7,940,177 B2 | 5/2011 | Krill |
| 7,961,094 B2 | 6/2011 | Breed |
| 8,004,405 B1 | 8/2011 | Gal |
| 8,077,036 B2 | 12/2011 | Berger |
| 8,111,156 B2 | 2/2012 | Song et al. |
| 2002/0082886 A1* | 6/2002 | Manganaris et al. ............ 705/7 |
| 2006/0017566 A1 | 1/2006 | Gauvreau |
| 2006/0143672 A1 | 6/2006 | Renkis |
| 2006/0239603 A1 | 10/2006 | Patel |
| 2007/0195759 A1* | 8/2007 | Chowdhury et al. ......... 370/389 |
| 2008/0036589 A1* | 2/2008 | Werb et al. ............... 340/539.22 |
| 2008/0084294 A1* | 4/2008 | Zhiying et al. ........... 340/539.22 |
| 2008/0111680 A1* | 5/2008 | Presicci ................... 340/539.22 |
| 2008/0221836 A1* | 9/2008 | Tateson ......................... 702/188 |
| 2008/0287144 A1* | 11/2008 | Sabata et al. ............... 455/456.6 |
| 2009/0212943 A1 | 8/2009 | Burnard |
| 2010/0045457 A1* | 2/2010 | Krill ........................ 340/539.22 |
| 2010/0080175 A1* | 4/2010 | Kang et al. ..................... 370/328 |
| 2010/0102923 A1* | 4/2010 | Tamaki ........................ 338/309 |
| 2011/0063110 A1* | 3/2011 | Habib et al. .................. 340/552 |
| 2011/0102178 A1 | 5/2011 | Kalo et al. |
| 2011/0172954 A1 | 7/2011 | Berger et al. |
| 2011/0254680 A1 | 10/2011 | Perkinson |
| 2012/0025979 A1* | 2/2012 | Monnerie et al. ........ 340/539.22 |
| 2012/0025987 A1* | 2/2012 | Mostov ..................... 340/572.1 |

OTHER PUBLICATIONS

Networked Situational Awareness Sensor (SAS) System; Bae Systems (2pgs), May 2006.

* cited by examiner

INTELLIGENT SENSOR NETWORK

CROSS-REFERENCE TO RELATED APPLICATIONS

The present application claims the benefit of and priority to U.S. Provisional Patent Application No. 61/643,773, filed May 7, 2012, the entire disclosure of which is incorporated herein by reference.

BACKGROUND

Historically, many intrusion detection systems have been implemented as wired detection systems with a single type of sensor in areas with permanent or long standing barriers surrounding the perimeter of military bases, correctional facilities, and select transportation industries. In such systems, unintelligent transducers are connected by wiring that delivers communication data and power to each transducer attached along the barrier. In such systems, the transducers report input to a central processing device through the wiring where the sensor input is processed and a determination is made as to whether the sensor data indicates an intrusion.

However, intrusion detection systems are now desired in a vast array of facilities including facilities where the perimeters may need to be altered, perimeters are non-contiguous, or where detection mobility is desired, for example. In such cases, wired detection systems are undesirable because they increase manual setup time in the case of perimeter alteration and are prone to failure in cases where the power and communication wire is cut or otherwise damaged. Accordingly, a detection system that can be used in a wide variety of settings with robust failure protection and efficient power management is desired. In addition, it is further desired to implement an accurate and power efficient multi-dimensional detection system to reduce false alarm rates prevalent in previous low cost single dimension detection systems.

SUMMARY

According to one embodiment, a method includes receiving a first input from a first sensor at a first sensor node of a wireless ad hoc network and comparing the first input to a first predefined input threshold associated with an intrusion activity at the first sensor node. The method further includes wirelessly communicating an indication of the intrusion activity from the first sensor node to a gateway device via a second sensor node of the wireless ad hoc sensor network. The gateway device includes an interface between the wireless ad hoc sensor network and a user-interactive system configured to monitor the wireless ad hoc sensor network.

According to another embodiment, a sensor network includes a first sensor node including a first sensor and a second sensor node wirelessly coupled to the first sensor node within a wireless ad hoc network. The second sensor node includes a second sensor. The sensor network further includes a gateway device wirelessly coupled via the wireless ad hoc network to the first sensor node and the second sensor node. The gateway device includes an interface between the wireless ad hoc sensor network and a user-interactive system configured to monitor the wireless ad hoc sensor network. The first sensor node is configured to receive a first input from the first sensor, compare the first input to a first predefined input threshold associated with an intrusion activity, and wirelessly communicate an indication of the intrusion activity to the gateway device via the second sensor node.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description and the drawings.

DETAILED DESCRIPTION

Before describing in detail the particular improved system and method, it should be observed that the inventions include, but are not limited to a novel structural combination of data processing components and communications networks, and not in the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventions are not limited to the particular embodiments depicted in the exemplary diagrams.

In some perimeter detection systems, activities such as perimeter intrusions are detected by unintelligent transducers each placed on a barrier such as a fence. In many such systems, the transducers communicate data and receive power from a common wired connection. The common wired connection typically connects each transducer to a central power source and a central processor. Accordingly, in such perimeter detection systems, the location of the transducer is limited by the length of the wired connection. Furthermore, in such systems, the central processor receives input from each wired transducer to determine if an intrusion has occurred. One problem faced by current perimeter detection systems is a high false alarm rate. For example, many current detection systems include sensor nodes that cannot distinguish between an intruder or debris hitting making contact with a fence. In addition, current systems may require additional hardware, such as an anemometer or microwave Doppler devices, for example, to distinguish between an intruder and other weather related disturbances. Furthermore, because the transducers receive power and communicate on a wired connection, any single point of failure to the wired connection could compromise large portions of the transducers on the common wired connection to lose functionality.

According to one embodiment, a method of detecting and reporting intrusion activity along a perimeter to a user using a wireless network of sensors includes using multiple power efficient, fault resistant, intelligent sensor nodes with a power source, a processing unit, a memory, and at least two sensors, to detect a series of predetermined intrusion activities and wirelessly communicate the detected intrusion activities to a computing device to perform an action such as generating an alarm, or transmitting an alert accessible through a GUI on a CPU or mobile device, for example.

Figure 1:
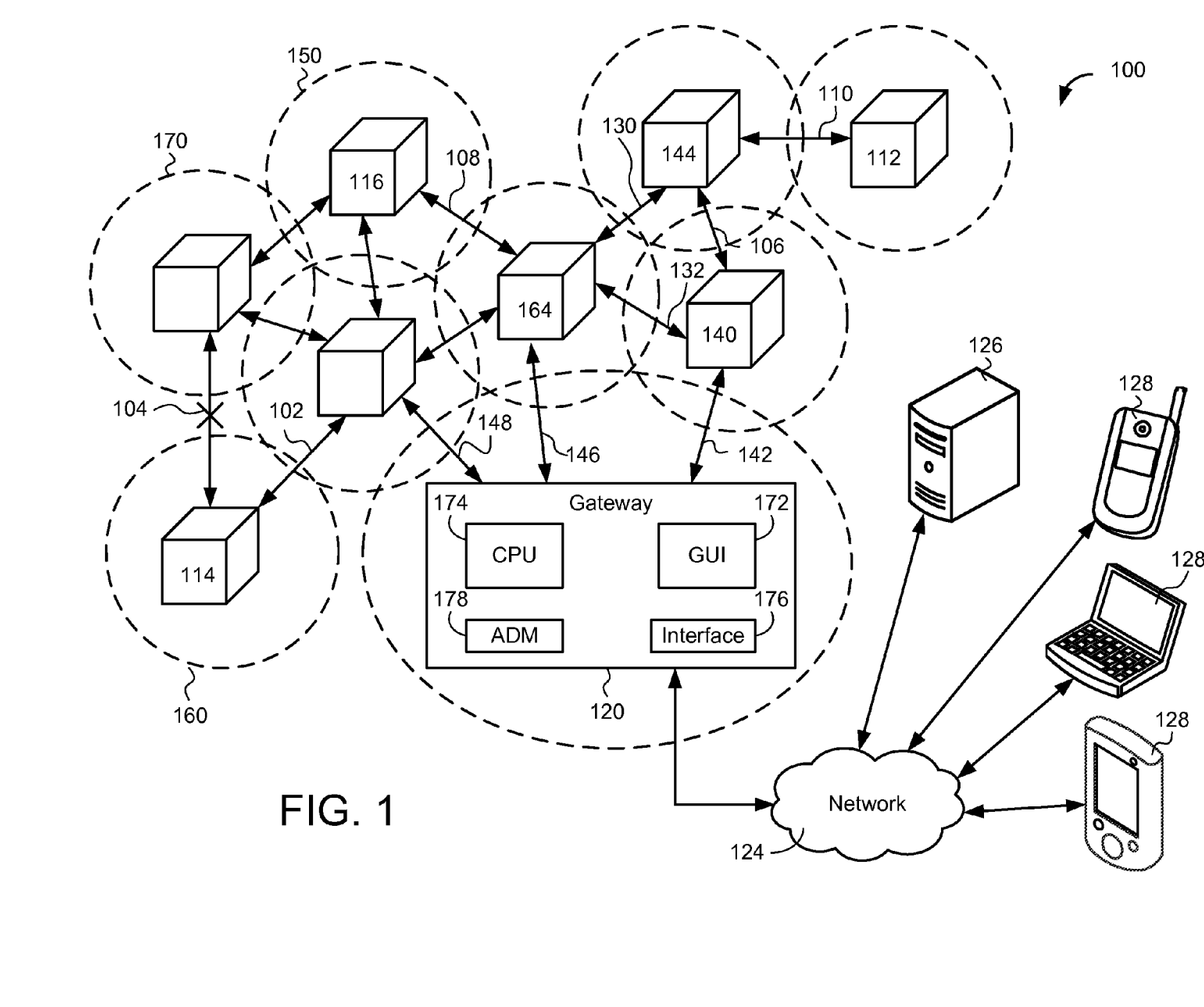
FIG. 1 is an intelligent sensor network according to one embodiment.

FIG. 1 depicts one example of an intelligent sensor network 100 that is intended to address these deficiencies as well as to provide other advantageous features. Intelligent sensor network 100 includes any number of intelligent sensor nodes 112, 114, 116, 140, 144, 164, etc. According to one embodiment, sensor nodes communicate with each other and with a gateway or base station 120 wirelessly according to a wireless communication network protocol, such as a mesh network protocol, for example. According to some embodiments, the wireless communication network protocol is a proprietary or standards based protocol such as include ISA 100.11a, Smart Objects Network, and 6LoWPAN, IEEE 802.15.4g, and IPV6, for example.

Each of the sensor nodes in network 100 may include multiple analog and/or digital interfaces to sensors, allowing each sensor node to detect activity occurring within a sensing range of the sensor node. Accordingly, each sensor node provides a physical interface between the wireless network 100 and the sensors that generate sensing signals at each sensor node. According to one embodiment, each sensor node includes a power source such as a battery, a transceiver unit for wireless communication, a microprocessor for running intrusion detection processes, and multiple sensors used to generate sensor signals in response to detecting an activity such as an intrusion, for example. Because each sensor node includes a processor and memory, each sensor node is capable of determining whether one of several particular activities at the sensor node have occurred. According to one embodiment, each sensor node has a series of activities and sensor signal indicators associated with those activities stored in memory. Sensor inputs at each sensor may be compared with the sensor signal indicators stored in memory to determine whether a particular activity has occurred, according to one embodiment.

Referring again to FIG. 1, network 100 may be formed into any type of topology such as a star, ring, mesh, or star-mesh hybrid, for example. Network 100 may also be an ad hoc network wherein the network is formed without any predetermined topology or shape, as shown in FIG. 1. In ad hoc networks, sensor nodes wishing to communicate with other sensor nodes generate control or routing packets in addition to data packets to find and keep the routing paths used to determine what paths are taken to communicate between two sensor nodes or between a sensor node and a gateway. In ad hoc networks, sensor nodes can be placed in any arrangement and orientation desired by a user setting up an activity sensing network. This is in part because sensor nodes can communicate with any other sensor nodes within a wireless communication range, shown in network 100 as dashed circular lines 150, 160, and 170, for example. According to one embodiment, sensor nodes with overlapping communication ranges can communicate bi-directionally using an radio frequency (RF) antenna, for example, as depicted by bidirectional arrows 106, 108, 110, and 130. Accordingly, network 100 can be extended by adding additional sensor nodes within a communication range of another sensor node. In additional embodiments, a reliable wired connection carries information throughout the sensor network with nodes receiving power from this connection or locally to each node.

Figure 2:
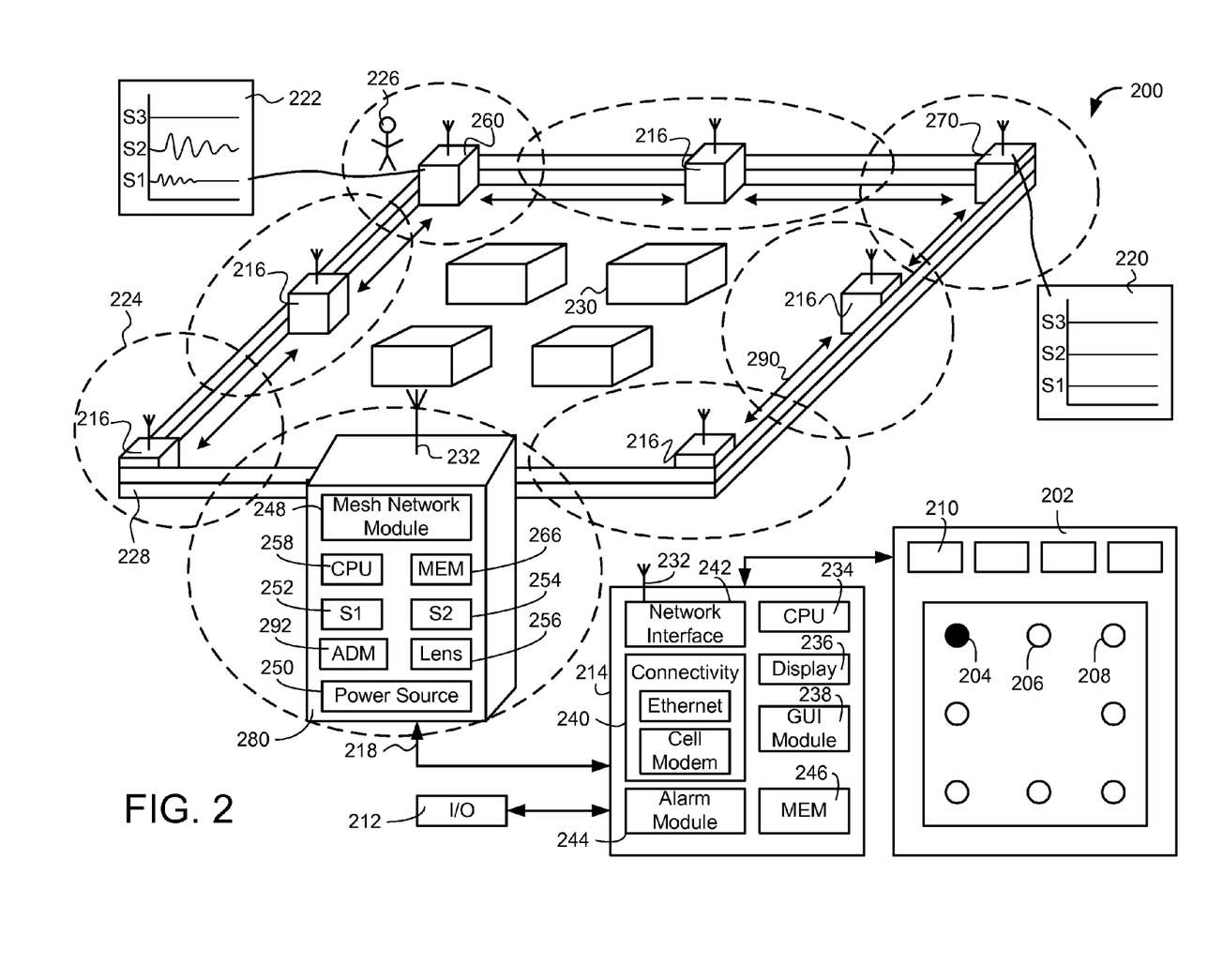
FIG. 2 is an intelligent sensor network used in a perimeter detection setting according to one embodiment.

Such flexibility allows network 100 to be highly adaptable, quickly deployable, and reusable in a wide array of activity detection settings. For example, sensor network 100 may be used as a physical security deterrent in non-permanent settings such as construction sites, truck depots, bus yards, ship yard containers, rapidly deployable perimeters, and temporary barriers. Network 100 may also be implemented such that the sensor nodes are fastened to a barrier such as hard wall perimeters or a fence barrier 228 as shown in FIG. 2, for example.

According to one embodiment, network 100 is designed to communicate intrusion activity detected at any given sensor node with gateway 120 and/or network connected devices 126, 128 (e.g., servers, cellular phones, PDA's, lap tops, or other computing devices) as shown in FIG. 1. Gateway 120 may be a computing device within communication range at least one sensor node. For example, gateway 120 shown as being within communication range of multiple sensor nodes 140, 164, etc. as shown in FIG. 1. Gateway 120 provides an interface between the sensor network 100 and a user for system control, monitoring, and communication with sensor network 100. Although a single gateway 120 is shown in FIG. 1, various embodiments may include one or more additional gateways would advantageously provide redundancy if the primary gateway 120 were to fail. Gateway 120 may allow a user or site administrator to send sensor software updates to the sensor nodes, for example. Furthermore, activity detection applications stored in activity detection module (ADM) 178 at gateway 120, may allow a user to monitor and control the processes carried out by the sensor nodes shown in FIG. 1.

For example, information received from the sensor nodes such as sensor input, intrusion alarms, and sensor node power levels may be received and aggregated by gateway 120 and forwarded to ADM 178. This information may further be monitored at graphical user interface (GUI) 172 by a user. According to one embodiment, GUI 172 is embedded into the gateway 120, thereby removing the re-occurring burden of a PC application in non-traditional security applications, for example. Another option for non-traditional security sites is to include an interface at gateway 120 with a commercial alarm panel allowing easy integration for perimeter security. For larger commercial installations, gateway 120 can be tied to a PC application inside the facility via copper or long haul fiber based Ethernet connections. Also, same site administrators may opt to use their own graphical software requiring zone alarm relays as the interface to their system. Furthermore, some market applications may be used in smaller, localized sites where gateway 120 will merely include an on-board display. In these types of applications, the user will likely not be on site for a majority of the time as on larger commercial sites. In such applications, gateway 120 may forward sensor data collected in network 100 to a server 126 or client devices 128 using network interface 176 and network 124 so that activity detection and sensor network data can be monitored off-site by a user carrying a client device 128. According to one embodiment, gateway 120 does not include GUI 172 and is merely a transceiver device to forward sensor network data to network connected devices such as a server 126 or client device 128.

Client devices 128 may include desktop computers, smart phones, personal digital assistants (PDA), mainframes, minicomputers, personal computers, laptops, or any other computing device, for example. Network element 124 can comprise a local area network (LAN), wide area network (WAN), a telephone network, such as the Public Switched Telephone Network (PSTN), a wireless link, an intranet, a cellular network, the internet, or combinations thereof. According to some embodiments, a user may alter the network 100 or sensor node settings at a personal computing device 128 while they are remote from network 100. In addition, because network 100 may be monitored remotely by personal computing devices 128, network 100 may be monitored without requiring security personnel to monitor gateway 120 on location. In embodiments where a server 126 or client device 128 is used, ADM 176 and GUI 172 may additionally be stored in memory at the server 126 or client device 128.

Furthermore, a user may provide input to the activity detection application at gateway 120, client device 128, or a website stored on server 126. User input such as network setting changes or software updates can be forwarded from the gateway 120 to one or more sensor nodes. For example, upon viewing sensor sensitivity settings (e.g., a sensor signal threshold level that triggers an alarm) at GUI 172 or a display on a client device 128, a user may enter a command at gateway 120 instructing processing units in one or more sensor nodes to adjust sensor detection according to current site activity.

Referring again to sensor network 100, network 100 may designed to communicate in a power efficient, and fault tolerant manner using predefined network protocols. For example, various wireless network protocols may allow all wireless sensor nodes to communicate data packets directly with each other and to transmit the data packets according to various routes from a sensor node 112 to gateway 120. For example, if an activity such as a person entering a predefined area, is detected at sensor node 112, data describing this activity may be transmitted from sensor node 112 to gateway 120 using any number of communication paths. For example, sensor node 112 may relay data through network 100 to gateway 120 through communication links 110, 106, and 142. Alternatively, sensor node 112 may communicate data through communication links 110, 130, and 146. Network 100 may determine a path based on sensor node power levels, failed sensor nodes, data traffic congestion, etc. According to one embodiment, each sensor node 112, 114, 116, 144, etc. relies on a network layer routing algorithm stored at each node to discover routes and deliver data packets from sources to destinations. Routing layer protocols manage maintaining and repairing routes when communication links or hops 110, 106, and 142 are broken, due to repositioned sensor nodes, failure of sensor nodes, temporary RF interference, or traffic congestion, for example. Accordingly, routing algorithms may be used to determine to find the most efficient data path route(s) to use between network modules and to dynamically find new paths when conditions within the network change.

According to one embodiment, routing algorithms are executed by a processing circuit at each sensor node in sensor network 100. Furthermore, each sensor node may store route information to every other node in sensor network 100 in routing tables. These routing tables may be updated periodically to account for changes in network topology and link conditions. Alternatively, the sensor nodes do not have routing data to every other sensor node in the network, but rather use a dynamic routing algorithm to establish and maintain routes on demand, for example, at the request of nodes that have traffic to send to specified destination nodes or gateway 120. Dynamic routing is particularly effective for ad hoc wireless networks, such as network 100 where network nodes can be highly mobile.

Some dynamic routing algorithms such as dynamic source routing (DSR) and ad hoc distance vector routing (AODV) determine whether a complete route to a destination, such as the route between sensor node 112, and gateway 120 is possible based on known factors before transmitting data packets that carries the full route information to each node in the complete route. According to some embodiments, transmitting data packets prior to generating an entire source to destination multi-hop route can be beneficial as generating such a route requires additional overhead for each transmission and additional processing at each sensor node. According to one embodiment, as a route discovery packet (e.g. in a preamble packet prior to a data packet) arrives at each sensor node, the route discovery packet only inquires as to communication link availability with neighbor sensor nodes (e.g., sensor nodes within one hop or communication link of the transmitting sensor node) rather than all network sensor nodes to reduce overhead and processing time.

For example, a route discovery packet transmitted from sensor node 144 would request data from sensor nodes 112, 140 and 164 rather than from all sensor nodes in network 100. Accordingly, such a routing technique is probabilistic in that it only uses data from local nodes to determine a best route to a final destination, such as gateway 120. When network 100 is implemented in a highly dynamic environment such as rapidly deployable temporary barriers, the probabilistic route determination approach may produce significantly less overhead in packet delivery than deterministic approaches such as DSR and AODV. Furthermore, routing protocol that implements probabilistic route determination may also be beneficial so that low cost microcontrollers with limited computational capacity may be used in the sensor nodes of sensor network 100.

Furthermore, network 100 also provides power efficiency advantages according to one embodiment. For example, each sensor node may include a power source such as a battery to enable sensor signal generation, sensor signal processing, and network communication. Network 100 may be designed to prolong the battery life at each node by implementing a node sleep pattern that periodically wakes up nodes for communication. When in an active state, a sensor node is transmitting data, waiting to receive data, for example. The sensor nodes may be woken up on a regular basis to report their presence and/or health status (e.g., power level, ability to communicate, etc.) to other sensor nodes and/or gateway 120 in network 100. Timing schematic 502 in FIG. 5, described in further detail below, provides one example of a sleep pattern of a sensor node with a series of awake 504 and sleep 506 times. Alternatively, sensor nodes may be woken up to transmit to another sensor node when certain activities are detected, such as if an intruder is detected rather than according to a predetermined pattern. When in sleep mode, the power consumption of a sensor node is minimal in the absence of a detected activity, such as an intruder. For example, during a sleep mode, each sensor node may not supply power to a transceiver such that the sensor node cannot send or receive data. Various sensors at each sensor node may reduce power consumption during inactivity time out periods by optimizing sensing parameters such as read rate and current consumption. In addition, in order to further conserve battery power, wake-up times may be only as long as is required to transmit a preamble packet with routing information and a data packet indicating that the detected activity occurred, according to one embodiment.

According to some exemplary embodiments, network 100 may be implemented in perimeter detection setting 200 as shown in FIG. 2. According to one embodiment, sensor nodes 216 are attachable and are fastened to fence 228 forming a perimeter around a facility including buildings 230. When implemented into a perimeter, sensor nodes 216 may be programmed to detect a predetermined selection of activities, such as an intruder 226 attempting to enter perimeter 228. If any sensor node, such as sensor node 260 receives input sensor signals and determines if the sensor input signals correspond to an intruder, the sensor node may transmit an alarm to gateway 214, which may initiate an action such as altering display 202, turning on a video camera system, sounding an audible alarm, turning on a lighting system, transmitting a communication to local authorities, transmitting a message to a client device across a network, etc.

Perimeter 228 in perimeter sensor network 200 may be any type of perimeter demarcation element such as a fence, wall, posts, or temporary barrier, for example. According to one embodiment, perimeter 228 is as a chain link fence where sensor nodes 216, 260, 270, and 280 are attached or fastened to a front portion, top portion, or other portion of fence 228 such that each sensor node is suspended to fence 228 above ground level. Sensor nodes 216 shown are shown at a larger scale for illustration purposes, while sensor node 280 is shown at an even larger scale in order to depict components that may be included in each sensor node.

According to one embodiment, each sensor node 216, 260, 270, and 280 in the perimeter detection system 200 includes a power source such as a battery 250 and a transceiver antenna 232 for wireless communication. According to one embodiment, transceiver antennas 232 communicate on license free frequency bands such as 900 MHz or 2.4 GHz, for example. However, proprietary frequencies may also be used. Nonpublic frequencies that have the benefit of increased security and resistance to interference from other local RF applications. Furthermore, according to one embodiment, power source 250 is a Lithium Thionyl Chloride battery, although power source 250 may also be a mechanism used to receive energy harvested from solar, vibration, turbine, or thermal source, for example. In addition, the power source 250 may be any other type of battery such as Lithium-ion, NiMH, NiCd, etc. According to one embodiment, the sensor node includes circuitry to receive solar energy from one or more solar cells and charge of one or more batteries. This circuitry enables the battery to continually charge when the solar source is available, while the battery can power a wireless sensor node from the stored energy when the solar power is no longer available. Sensor nodes, such as exemplary sensor node 280 may also include at least one processing circuit 258, such as a microcontroller for running activity detection processes, sensor detection processes, and routing algorithms stored in memory 266. According to one embodiment, sensor node 280 includes at least two sensors, 252 and 254, although each sensor node may include two, three, four, ten, or more sensors, for example.

According to one embodiment, providing two more sensors in a sensor node network arranged in a perimeter embodiment 200 provides several advantages over known perimeter detection systems. According to one embodiment, a first sensor 252 is a vibration sensor used to detect vibration or acceleration of a segment of perimeter 228. According to some embodiments, a vibration sensor may be an accelerometer, gyroscope, a mechanical shock vibration sensor, or a tilt sensor, for example. Furthermore, a second sensor 254 may be a volumetric motion sensor used to monitor a predefined space outside or inside of perimeter 228 for motion. According to some embodiments, the volumetric sensor may be one of a thermopile sensor, microwave Doppler sensor, ultrasonic sensor, GPS receiver, or a heat sensitive optical sensor such as a passive infra-red sensor (PIR), for example. In embodiments that employ an optical sensor such as a PIR senor, an optical device 256 such as a Fresnel lens may be used to change the size and shape of the detection field within the monitored area without having to provide additional power. Using a vibration sensor and a volumetric sensor in combination allows sensor nodes 216, 260, 270, 280 to detect activity such as an approaching person 226 before the person reaches the perimeter threshold, allowing the perimeter detection to be preemptive rather than only reactive. According to one embodiment, multiple sensors allow sensor nodes to monitor a first sensor such as a vibration sensor for an intruder, and then receive data from a second sensor, such as a PIR sensor, to confirm whether an intruder is present. Furthermore, because both sensors are integrated into easily moveable sensor nodes 216, 260, 270, 280 preemptive perimeter detection does not necessarily require additional costly technologies used to confirm intrusion activity that would otherwise need to be fixably mounted in front of the fence line such as microwave Doppler based detection devices, for example.

In addition, multiple sensors in a single intelligent sensor node 216 allow processing unit 258 to monitor a sensor input to determine if a certain activity constitutes an intrusion activity or a non-intrusion activity before transmitting to gateway 214. Charts 222 and 220 depict an example of three sensor input waveforms generated by three distinct sensors at a first sensor node 260 and a second sensor node 270. Each sensor node 260, 270, 216, etc. may continuously monitor the combination of sensor input waveforms to determine if a particular activity has been detected according to a software program running at the sensor node. For example, for a non-intrusion activity such as wind, a vibration sensor may detect that a barrier such as a fence is moving. In some known detection systems with a single sensor, this barrier movement would result in an alarm transmitted to a central location. However, in the embodiment depicted in FIG. 2, an activity detection module (ADM) 292 executed at processing unit 258 would also receive data from a volumetric sensor 254. According to one embodiment, the ADM 292 would not generate an alarm signal unless the input signals from both the volumetric sensor and the vibration sensor indicated an intrusion activity. The ADM 292 may use signal level magnitude thresholds, relative timing between signal level thresholds, and/or other stored signal data, for example, to determine if a signal input indicates activity. For example, ADM 292 may determine that if a vibration sensor signal magnitude exceeds a threshold and the volumetric sensor does not detect a threshold level of motion within a predetermined period of time from the vibration signal exceeding a threshold, the activity will be determined to be a non-intrusion activity and no alarm will be transmitted to gateway 214.

According to one embodiment, sensor signals S1, S2, and S3 are all associated with a vibration sensor such as an accelerometer. An accelerometer may be configured to generate three separate sensor signals representative of different types of acceleration forces applied to a fence segment. For example, referring to a fence with respect to a Cartesian coordinate system, acceleration in the Y (e.g. acceleration in a an axis along a fence height), X (e.g. acceleration in an axis along a fence length), and Z (e.g. acceleration in an axis perpendicular to the fence length and the fence height) directions may be detected by the accelerometer. In this example, an intruder climbing a fence 228 may cause the accelerometer to generate an acceleration signal with a large magnitude in the Y direction while generating acceleration signals with minimal or no magnitude in the X and Z directions. Furthermore, a non-intrusion activity, such as debris hitting a fence 228 may cause the accelerometer to generate an acceleration signal in the Z direction that has a much larger magnitude than the acceleration signals generated in the Y and X directions. Accordingly, ADM 292 may be able to receive one, two, three, four, five, six, or more axis acceleration signals as input to determine whether an intrusion or non-intrusion activity is occurring. In this way, ADM 292 may use input from various sensors to discriminate between several different types of activity such as intrusion activities (e.g., an intruder scaling a fence) and non-intrusion activities such as wind, animals, debris, lightning, rain, planes, automobile traffic, etc. According to one embodiment, ADM 292 will only initiate transmission of an alarm message to gateway 214 in response to activities classified as intrusion activities.

Referring now to gateway 214 shown in perimeter sensor detection network 200, gateway 214 may provide an interface between the sensor network 200 and a user interacting and monitoring perimeter sensor network 200. For example, information received from sensor nodes 216, 260, 270, and 280 such as a data packet indicating a type of detected activity at a particular sensor node may be received at gateway 214 and formatted or otherwise processed at network interface 242. Network data received at gateway 214 may include sensor node failure alerts, sensor node battery levels, timestamp data, and real time signal data generated at the sensor nodes (e.g. as shown in exemplary charts 220 and 222), for example. The real time signal data may be recorded in memory 246 along with timestamp data so that a user such as a network administrator can replay previously recorded sensor signals and seek particular signal data occurring at a particular time, for example. According to one embodiment, gateway 214 receives network data using an RF transceiver 232. Once network data is received at transceiver 232, the data may be received at network interface software module 242 to be processed for transmission to various other modules at gateway 214 such as GUI module 238, connectivity module 240, and alarm module 244.

According to one embodiment, data received at network interface 242 (e.g., intrusion activity alarm, sensor node failure alerts, sensor node battery levels, timestamp data, real time sensor signal data, etc.) is aggregated and sent to GUI module 238. GUI module 238 may include a software program used to provide graphical input to display 202. Display 202 may be monitor located on-site at the monitored facility 230, or may be the display of a client device 128 as shown in FIG. 1, for example. According to one embodiment, GUI module 238 receives various sensor node locations along perimeter 238 and converts the relative sensor node locations into display data for display 202. Display 202 may depict the sensor node locations by using graphical elements such as graphical elements 204, 206, and 208. Display data on display 202 may also include a site-specific perimeter graphic, such as an overhead view of the monitored facility 230 combined with the graphical elements 204, 206, and 208 indicating sensor nodes to aid a user's ability to determine where each of the sensor nodes are located.

According to one embodiment, display 202 may be continually updated in real time by data received at transceiver 232 from sensor network 200. For example, if a particular sensor node 260 generates sensor node signals S1, S2, and S3 as shown in exemplary chart 222, and determines an intrusion activity is taking place, sensor node 260 may exit sleep mode and transmit an intrusion activity alarm to gateway 214 through intermediate nodes placed along perimeter 228. The intrusion activity alarm is then received at network interface 242, translated into display data and forwarded to GUI module 238. According to one embodiment, the display data may alter an aspect of the graphical element (e.g., color, brightness, etc.) associated with the sensor node 260 that detected an intrusion activity (e.g., graphical element 204).

In addition, for graphical element 208 corresponding to a node 270 and sensor signals 220, if no intrusion activity is taking place, graphical element 208 may remain in a default state to indicate that no intrusion activity has been detected by sensor node 270. Display 202 may also allow a user to access various other data reported from perimeter sensor network 200 to gateway 214. For example, graphical elements 210 may correspond to a list of selectable options for a user such as a site administrator. Selecting a graphical element 210 may result in display 202 displaying different data associated with perimeter sensing network 200. According to one embodiment, selecting graphical elements 210 may allow a user to view and interact with displays containing data related to real time sensor signals generated at each sensor node, timestamp data, previously recorded sensor signals, sensor node power levels, sensor node transmission distance, network congestion, sensor node failures, video camera feeds, etc. According to one embodiment, each graphical element 204, 206, and 208 represents a zone, or subsection of perimeter 228. Each zone may cover a predetermined area that is being sensed by one or more sensor nodes. Because sensing zones of the present invention are highly mobile, sensing zones may be altered regularly by moving sensor nodes 216. In many current perimeter detection systems, such as wired detection systems, altering such zones is time consuming as it requires a great deal of physical labor including rewiring, and termination. Here, network 200 may automatically detect the location of each sensor node 216 and transmit the updated location for display on display 202.

Furthermore, users of display 202 may input various updates to perimeter sensor network 200 using display 202 and I/O device 212. I/O device 212 may include one or more user interface elements to receive an indication of user input including audio, mechanical, visual, motion, or other input. According to one embodiment, a user may transmit software updates, changes in transmission distance, and changes in activity detection algorithms, to one or more sensor nodes in network 200 from gateway 214. Additionally, detection parameters such as detection range or sensor signal thresholds required to trigger an intrusion alarm can also be modified from the GUI display 202 and transmitted to one or all of the smart sensor nodes from gateway node 214.

In addition to a user interacting with a gateway 214 on site at facility 230, a user may interact with gateway 214 from a client device 128 as shown in FIG. 1 through a network 124. Network 124 may be established through Ethernet port, cell modem or other communication ports that be included in connectivity module 240. In addition, gateway 214 may transmit perimeter sensor network 200 data to a server 126 so that the perimeter sensor network data may be accessed on a website by a user. In addition to using perimeter sensor network data for display and user interaction, the perimeter sensor network data received at gateway 214 may also be forwarded to an alarm module 244. Alarm module 244 may be a combination of software and/or hardware used to perform an action based on a detected intrusion activity. For example, if a detected intrusion activity is received at alarm module 244, the alarm module 244 may transmit an electrical signal to turn on a video camera system, sound an audible alarm, turn on a lighting system, transmit a communication to local authorities, transmit a message to a client device 128 across a network, communicate with an available alarm panel, send messages to smart phone applications and video displays, etc. in response to the detected intrusion activity.

Figure 3:
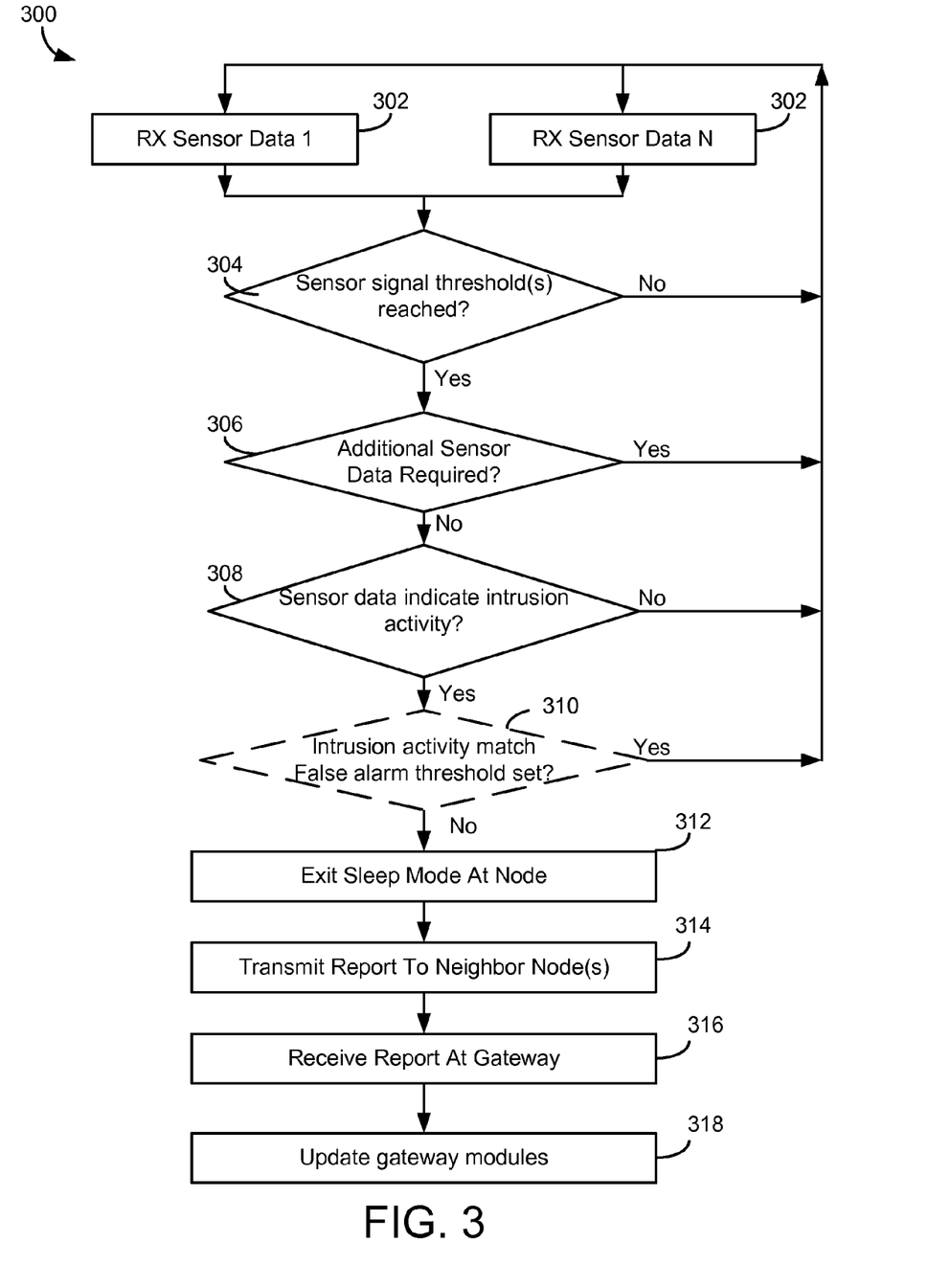
FIG. 3 is a general flow chart of a process for reporting activities based on sensor input according to one embodiment.

Referring to FIG. 3, one exemplary embodiment of an activity detection program stored in the memory 266 of sensor node 280 that carries out process 300 when it is executed by a processor 258. According to one embodiment, process 300 receives sensor input from a first sensor 252 (e.g., a vibration sensor) and a sensor 254 (e.g., a volumetric sensor)

at step 302. However, any number N of sensors may be implemented in each sensor node as indicated by step 302 of process 300, which receives sensor data 1 through sensor data N from each of N sensors. Furthermore, although sensors 1-N are shown as activated at step 302, step 302 may receive data from various sensors in a staggered fashion. For example, a secondary sensor (e.g., a volumetric sensor) may be activated and interrogated for intruder detection based on a primary sensor's (e.g., a vibration sensor) activity detection to confirm an activity detected by the primary sensor. For the purposes of illustration, exemplary charts 220 and 222 are shown in FIG. 2 to provide of an example of sensor signal waveforms generated at a particular node 260, 270. At step 304, one or more of the 1-N sensor signal waveforms received at step 302 may be compared with a threshold value or a set of threshold values that are associated with intrusion activities. As stated previously, each intrusion activity may have one or multiple associated threshold levels that are stored in memory for comparison with sensor signals.

Figure 6:
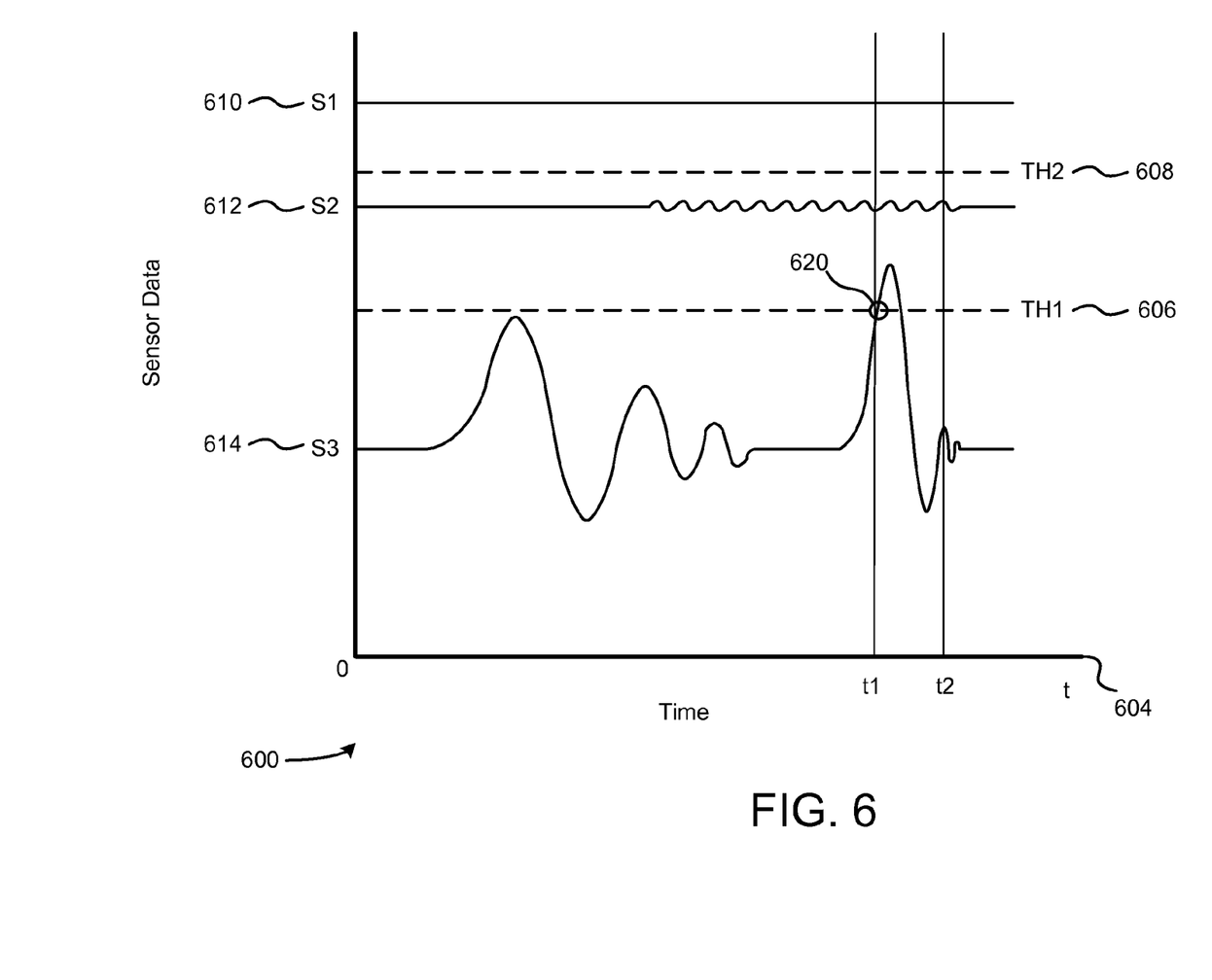
FIG. 6 is a chart depicting multiple sensor inputs at a sensor node in a sensor network according to one embodiment.

For example, FIG. 6 depicts sensor data from three separate sensors S1, S2, and S3 located at a sensor node. According to one embodiment, if no sensor signal thresholds associated with any intrusion activities are detected at step 304, process 300 simply continues to receive additional sensor input. However, if one or more sensor signal thresholds, such as threshold 606, or threshold 608 are exceeded, process 300 may determine that an intrusion activity has occurred or may be occurring. According to one embodiment, each of the intrusion activities may be defined by a single threshold at a single time (e.g., threshold 606 at time t1), multiple thresholds at a single time (e.g., threshold 606 and threshold 608 at time t1), a single threshold at multiple times (e.g., threshold 606 at time t1 and t2), or multiple thresholds at multiple times (e.g., threshold 608 at time t1 and t2 and threshold 606 at time t1 and time t2).

According to one exemplary embodiment, sensor input signals 610, 612, and 614 correspond to sensor input received from an accelerometer sensor, where signal 614 is acceleration in the Y direction, signal 612 is acceleration in the X direction, and signal 610 is acceleration detected in the Z direction with respect to a fence that a sensor node is mounted on. In this example, a specific intrusion activity, such as an intruder climbing a fence may be defined as an activity that results in the generation of signal 614 representative of acceleration in the Y direction (e.g., a large downward acceleration from the height of the fence towards the ground caused by an intruder pushing down on the fence to scale the fence) that exceeds threshold 606 at any point in time. According to this example, if threshold 606 is exceeded by acceleration input 614 as shown in FIG. 6, process 300 would move to step 306. Because the fence climbing intrusion activity is only defined as exceeding one threshold at one time, no additional sensor data is required at step 306 to determine that an intrusion activity was detected at step 308. However, as stated previously, various intrusion activities may be associated with multiple thresholds at multiple times such that at step 306, process 300 must wait for additional sensor data to determine whether an intrusion activity has occurred at step 308. For example, once step 304 determines threshold 606 is exceeded at time t1, process 300 may have to wait until time t2 to determine if threshold 608 is exceeded at time t2 before confirming a particular intrusion event has occurred at step 308.

Figure 7:
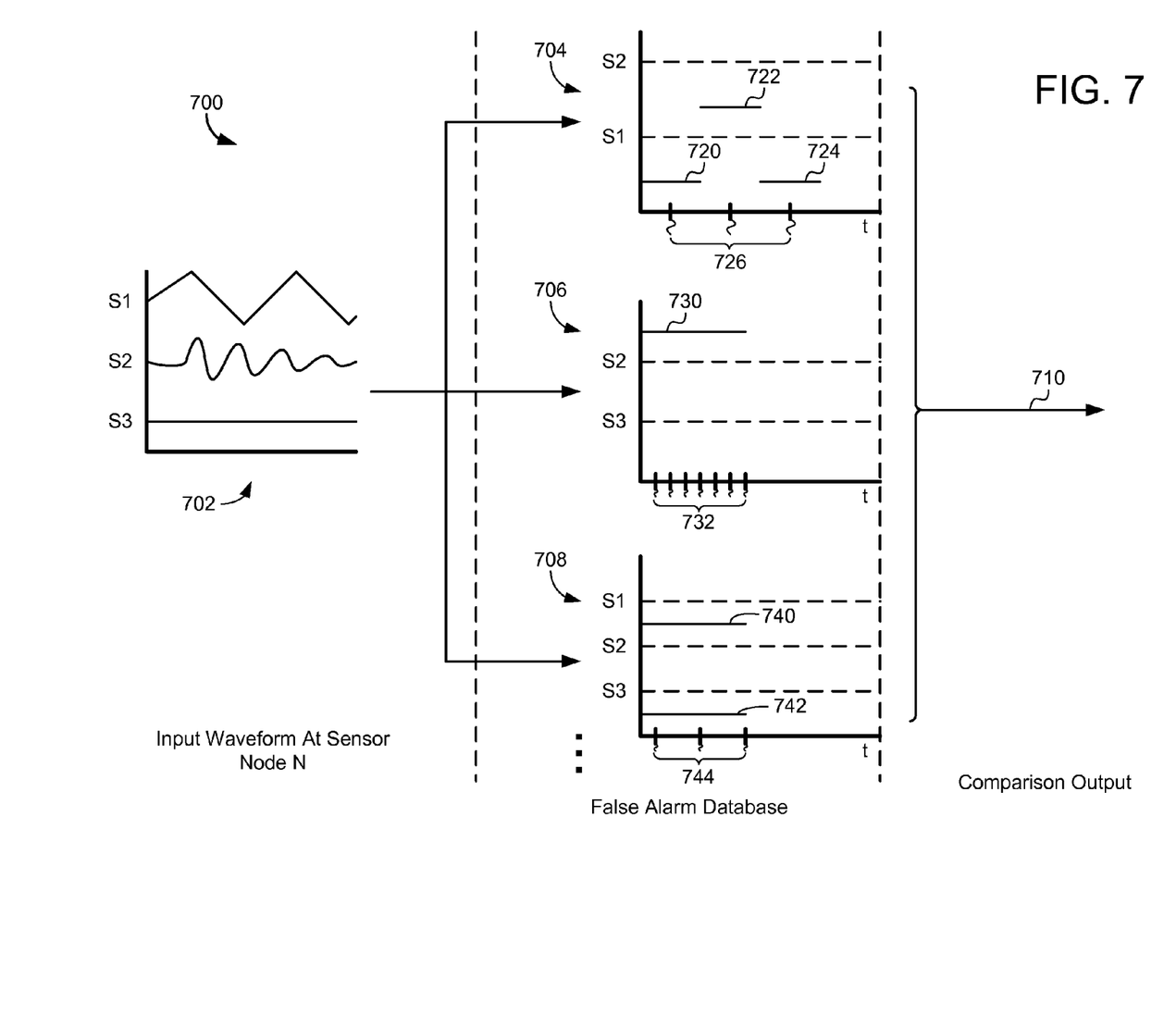
FIG. 7 is a depiction of a process for comparing sensor node inputs with false alarm thresholds according to one embodiment.

According to one embodiment, once it has been determined that an intrusion activity is detected at step 308, process 300 may optionally provide the step of filtering out particular activities that generate sensor signal combinations that may falsely be determined as an intrusion activity at step 310. For example, referring to FIG. 7, signal data 702 received from a sensor node containing signal data from sensors S1, S2, and S3 may be determined to be an intrusion activity at step 308. Signal data 702 may then be compared with a series of false alarm thresholds 704, 706, 708, etc. stored in a false alarm database in memory 266 of a sensor node. For example, each of the false alarm thresholds may be associated with non-intrusion activities such as wind, tumbleweeds, jet blasts, train vibration, pump activation, etc. A match between signal data 702 may be determined based on whether one or more of the signals, S1, S2 and S3 exceed one or more thresholds 720, 722, and 724, for example. As shown in false alarm threshold set 704, each threshold may be associated with a predetermined time or range of times 726. According to one example, false alarm threshold set 706 may be associated with a long duration of constant vibration as detected sensor S2. Accordingly, if a vibration input signal S2 from input data 702 exceeds a single vibration threshold 730 for time period 732, step 310 in process 300 will determine that input data 702 does match a false alarm threshold set, and process 300 will not proceed to steps 312-318 to transmit an intrusion activity alarm to gateway 214, according to one embodiment.

However, if an intrusion activity detected at step 308 does not match a false alarm threshold set at step 310, or step 310 is not included in process 300, process 300 proceeds to step 312 to report the intrusion activity to a gateway, according to one embodiment. Furthermore, although each sensor node may have the same false alarm threshold set stored in memory, various sensor nodes may also have varying false alarm threshold sets that are sensor node specific. According to one embodiment, the sensor signals generated at each sensor node, such as exemplary sensor signals shown in charts 222 and 220, may be transmitted to gateway 214 real time for viewing at display 202 and/or storing in memory 246. These recorded sensor signals may be used to provide sensor node specific false alarm threshold sets. For example, if one sensor node is close to train tracks while the rest of the nodes in a sensor network are not, a user may desire to prevent that sensor node from reporting an intrusion activity that may result from the regular occurrence of a train passing by that could activate both the vibration and volumetric sensors, for example. According to one embodiment, a user of gateway 214 may transmit the recorded sensor signals caused by a passing train to a selected sensor node to add that recording to the sensor nodes false alarm threshold set database. Accordingly, in the future, when a train passes the selected sensor node with an updated false alarm threshold set database, process 300 will prevent that sensor node from reporting an intrusion activity and carrying out steps 312-318 at step 310.

If an intrusion activity is detected at step 308 and the intrusion activity does not match a false alarm threshold step at step 310, steps 312-318 allow a sensor node to report the detected intrusion activity. To report an intrusion activity, a sensor node using a power efficient network communication protocol with sleep patterns may wake the node at step 312. Waking the node out of a sleep mode may include providing power to a transceiver unit 232, for example. Once a transceiver unit 232 of a sensor node 280 is powered, the sensor node may transmit a data packet indicating that an intrusion activity has been detected to gateway 214. According to one embodiment, data packet indicating intrusion activity includes the location of the node that detected the intrusion activity and timestamp data of when the intrusion activity was detected. According to one embodiment, the sensor nodes include an embedded GPS receiver that that is used to generate the location of the sensor nodes. The data packet may be transmitted in a series of single communication hops 290 at step 314 from sensor node to sensor node until the data packet reaches gateway 214 at step 316. According to one embodiment, after gateway 214 receives a data packet indicating an intrusion activity, network interface 242 may forward the indication of the intrusion activity to one or more modules 236, 238, 240, and/or 244 to perform further actions previously described. For example, GUI module 238 may receive an indication of the intrusion activity and alter a display data, such as a pixel color or pixel brightness, for example, of a graphical element 204 to convey to a user that an intrusion activity has been detected at sensor node 260, associated with graphical element 204.

Figure 4:
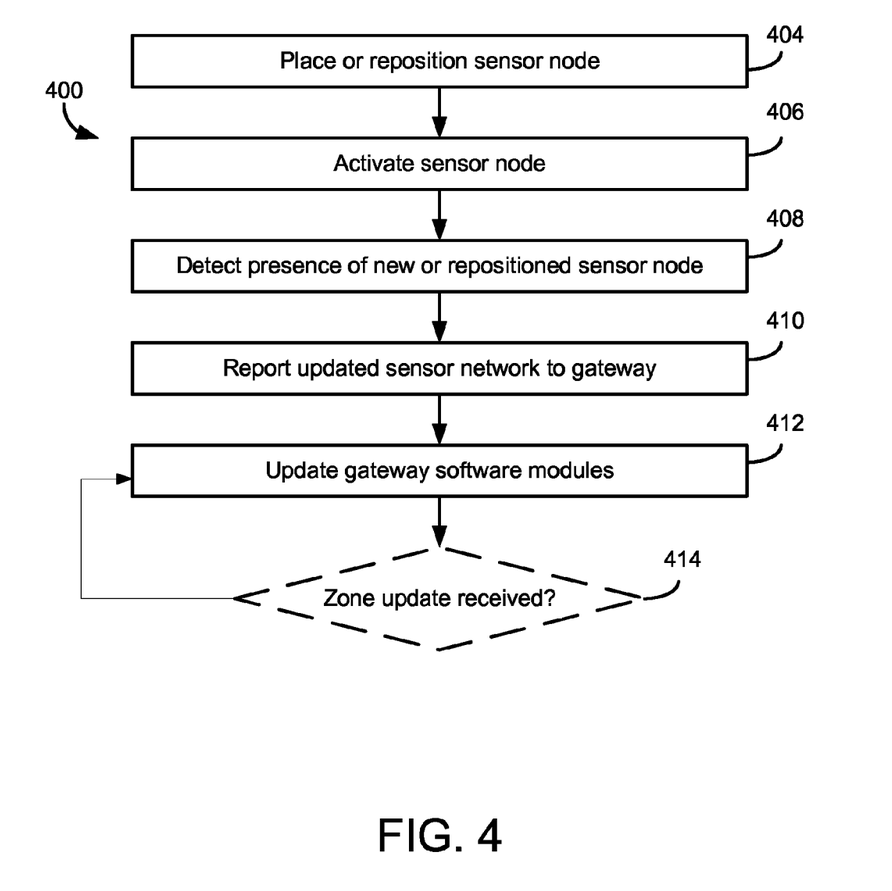
FIG. 4 is a general flow chart of a process for updating a sensor network according to one embodiment.

Referring now to FIG. 4, another aspect of exemplary sensor networks 100 and 200 is shown. According to one embodiment, process 400 allows for graphical depictions of sensor network 100, 200 to be updated real time on a display 202 to accurately convey zone states within a sensor network. As discussed previously, use of intelligent sensor nodes 112, 114, 116, etc. in a wireless network 100 allows sensor nodes to be added, removed and rearranged with respect to network 100 quickly while network 100 is still operational. For example, a user may wish to extend the range of sensor network 100 by placing additional sensor nodes into network 100 at step 404. A user may additionally desire to remove or rearrange sensor nodes within network 100 due to changed circumstances such as an altered perimeter shape at step 404. According to one exemplary embodiment, once an additional node has been added to the network 100 or has be moved within network 100, the sensor node should be powered on or activated at its new position within the network at step 406 to transmit its presence to other sensor nodes in the network 100 at step 408.

The sensor node may be powered on manually by an external switch or activated wirelessly from a gateway 120, according to various embodiments. According to one embodiment, the repositioned or new sensor node requests to join network 100 after being powered on or activated at step 406. According to another embodiment, the new or repositioned sensor node only reports its presence to a nearest neighbor node upon activation. Furthermore, the new or repositioned sensor node may not actively transmit its presence upon activation. Rather, the new or repositioned sensor node may merely be detected by a neighbor sensor node when a communication path to a gateway is requested at some future time. According to one embodiment, once the new sensor node is detected at step 408, the new sensor node position is reported to gateway 120 at step 412 to update the graphical elements 204, 206, 208, etc. representing the sensor network 200, for example, displayed on a display device 202. According to another embodiment, the sensor nodes will not automatically report new or repositioned sensor nodes to update graphical elements 204, 206, 208, etc., but will instead wait for a user to initiate a join node command at step 414. A location request may be a selectable option (e.g., by selecting a graphical element 210) on display 202 where a user requests gateway 214 to transmit a request for the location of each sensor node in the network 200. In response to receiving the request, each sensor node may transmit location data to update a graphical depiction representing sensor network 200 at step 412.

In addition, a user may have the option of altering sensing zones that make up a perimeter sensing network 200 at step 414. A sensing zone may be a subsection of perimeter or other area that is being monitored for an intrusion, according to one embodiment. Typically, zones are established as a convenient reference for a user to monitor a sensor network. For example, referring to display 202 in FIG. 2, graphical elements 204, 206, and 208 represent individual sensor nodes 260, 216, and 270. Accordingly, display 202 can be considered as having very low resolution where one sensor node is one zone or point detection. However, a user may indicate with I/O device 212 or through a touch screen input to change zone resolution such that each zone contains 2, 3, 5, 10 or more sensor nodes for a higher resolution sensor network display. For example, a user may desire to combine zones represented by graphical elements 204, 206, and 208 into a single zone represented single graphical element. According to one embodiment, if any sensor node assigned to a particular zone detects an intrusion activity, the graphical element for that zone will indicate an intrusion activity has occurred on display 202, by altering an aspect of the graphical element, for example. Additionally, other zone states could be included such as disarmed sensor(s), activated individual sensors, detection of pre-alarm motion activity or an indication of an individual located within proximity of a zone that is not designated as an intrusion activity. Accordingly, embodiments disclosed herein provide user initiated real time zone updates for a sensor network. This provides an advantage over some known wired sensor networks wherein zones are predetermined and unchangeable such that any changes to the zones are time consuming as the changes require a great deal of physical labor, rewiring, and termination.

Figure 5:
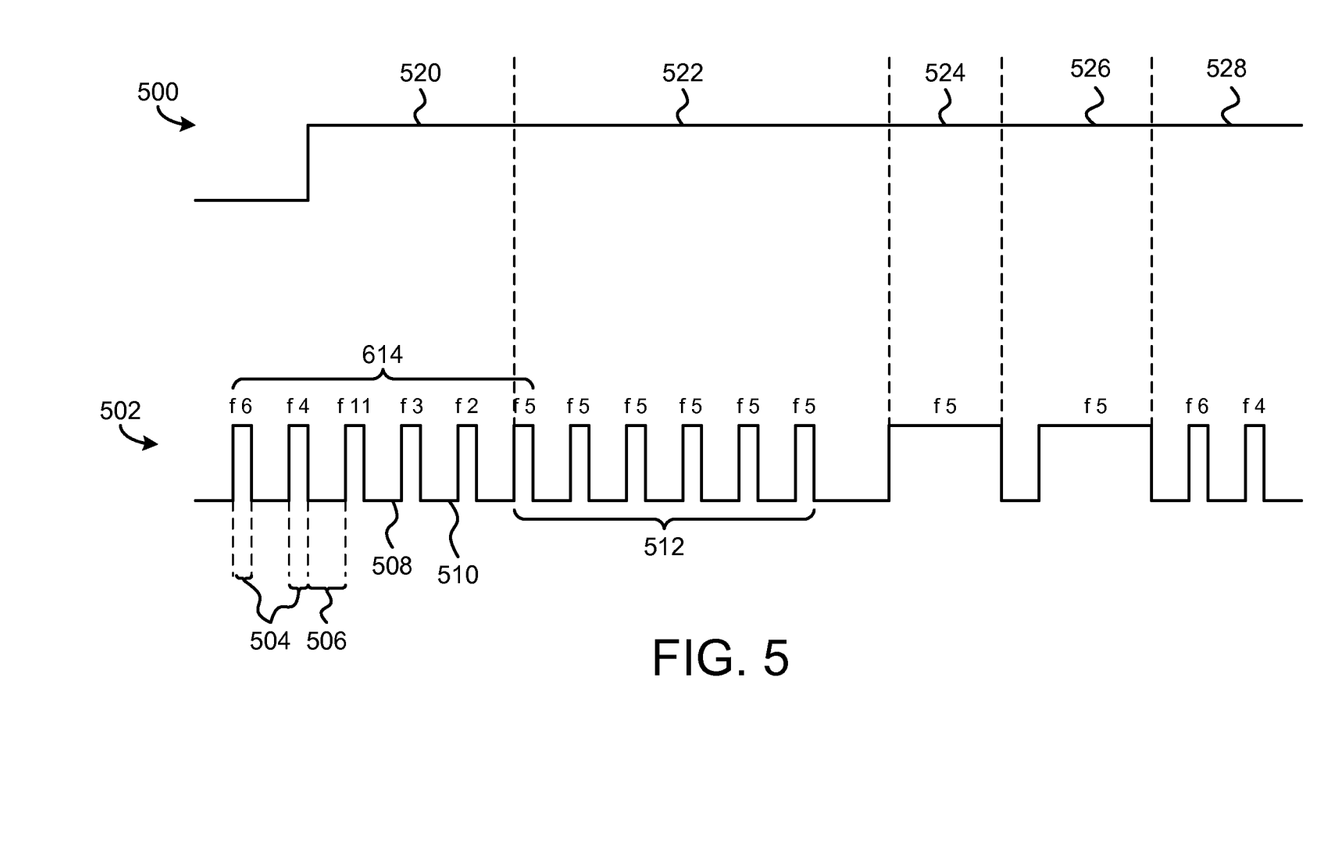
FIG. 5 is a chart depicting communication timing between sensor nodes according to one embodiment.

Referring to FIG. 5, another aspect of how sensor nodes 112, 114, 116, etc. communicate within a sensor network 100, 200 is depicted. Sensor nodes within sensor network 100 may use various techniques and protocols to improve inter-nodal communications. According to one embodiment, sensor nodes 100 communicate using spread-spectrum signals to improve resistance to interference and interception. Generally, spread spectrum transmitters transmit on a series of narrowband frequencies in a predetermined method. Spread spectrum receivers know the predetermined method and accordingly receive and de-spread the received signal to properly interpret the transmitted spread spectrum signal. Spread-spectrum signals may be created using various methods including the direct sequence spread spectrum (DSSS) method or the frequency hopping spread spectrum (FHSS) method, for example. The DSSS method spreads the narrowband signal out over a broad portion of the frequency band. The FHSS method spreads its signal by "hopping" the narrowband signal across a broad frequency range as a function of time. One advantage of the FHSS method is that it allows sensor nodes to have wake up times of a relatively short duration at each narrowband frequency thereby providing for relatively low power consumption.

FIG. 5 provides one example of how one or more sensor nodes 112, 114, 116, etc. within a sensor node network 100 may communicate using the FHSS method. According to one embodiment, waveform 502 depicts receiver sensor node timing. Receiver timing 502 includes short duration wakeup times 504 at various frequencies (e.g., frequency 6, 4, 11, 3, 2, and 5 shown during time span 614) followed by sleep times 506, 508, and 510 of a receiving node waiting for a transmission signal from a neighbor node. Waveform 500 depicts a transmitter sensor node timing, according to one embodiment.

For example, sensor node 144 may be a receiving node, receiving a communication 110 from a transmitting sensor node 112. Referring to FIG. 5, receiving node 144 wakes up during wakeup times 504 and operates in its normal operational mode for the predefined wakeup durations 504. These predefined wakeup durations may be configured by a user at gateway 120, and may be different for various sensor nodes 112, 114, 116, etc., according to one embodiment. During sleep times 506, 508, and 510, receiving node 144 may be in a low power mode, by, for example, powering down a transceiver unit to increase power efficiency. Accordingly, if a transmitting sensor node, such as sensor node 112 in this example, wants to send a communication to receiver node 144, it must do so within time span 504, or else wait until receiver node 144 wakes up again after a sleep time 506. However, receiver sensor node 144 wakes again, it may wake receiving a different frequency (e.g., f4 instead of f6). Accordingly, transmitting sensor node 112 must know the times at which receiver sensor node 144 wakes, the durations for which receiver node 144 is awake, and the frequency sequence for receiver node 144.

For example, transmitting sensor node 112 may send transmission signal on frequency f5 according to timing 500. Although a transmission signal is being sent to receiver node 144 during transmission duration 520, receiver node 144 is not receiving the transmitted data because the transmission frequency does not match the receiving frequency. Then, at the beginning of transmission duration 522, receiver node 144 frequency hops to frequency f5. According to one embodiment, once there is a frequency match the receiver node 144 is programmed to stay on the same frequency until all desired information is received from the transmitter node 112. For example, desired information may include a preamble data packet (e.g., including path routing data, sensor node wake up times, and sensor node frequency sequences), a data packet (e.g., including timestamp data, sensor node battery levels, sensor node location data, indication of an intrusion activity, etc.), and an end of frame indication in the data packet indicating when the transmission is complete. According to one embodiment, preamble data may be stored in frequency hopping lists in each sensor node to enable network communication.

Referring again to FIG. 5, once a frequency match occurs between a transmitting sensor node and a receiving sensor node at the beginning of duration 522, the FHSS sequence is halted and receiver node 144 listens for transmissions on frequency f5 to receive the preamble from transmitting node 112, according to one embodiment. After the preamble is received during time duration 522, the receiving node 144 may extend its waking time during time duration 524 to receive a data packet from the transmitting node 112, according to one embodiment. Once the data packet transmission is complete as indicated by an end of frame indication, the receiving node 144 may enter a transmission mode to transmit an acknowledgement packet to the transmitting node 112 to confirm the entire data packet was received during time duration 526, for example. According to one embodiment, once the data packet transmission and acknowledgement transmission is complete in time duration 526, the receiver will continue with its previous frequency sequence and sleep/wake durations as shown in time duration 528.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on one or more computer storage medium for execution by, or to control the operation of, data processing apparatus, such as a processing circuit. A processing circuit such as CPU 258 or 234, for example, may comprise any digital and/or analog circuit components configured to perform the functions described herein, such as a microprocessor, microcontroller, application-specific integrated circuit, programmable logic, etc. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and an I/O device, e.g., a mouse or a touch sensitive screen, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. In some cases, the actions recited herein can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    receiving a first input from a first sensor at a first sensor node of a wireless ad hoc network;
    receiving a second input from a second sensor at the first sensor node, wherein the second sensor is separate from and external to the first sensor, and wherein the first sensor node comprises the first sensor and the second sensor;
    comparing the first input to a first predefined input threshold associated with an intrusion activity at the first sensor node;
    comparing the second input o a second predefined input threshold associated with the intrusion activity; and
    wirelessly communicating an indication of the intrusion activity from the first sensor node to a gateway device via a second sensor node of the wireless ad hoc sensor network, wherein the gateway device comprises an interface between the wireless ad hoc sensor network and a user-interactive system configured to monitor the wireless ad hoc sensor network.

2. The method of claim 1, further comprising:
    determining, at the first sensor node, an existence of the intrusion activity in response to both the first input meeting or exceeding the first predefined input threshold and the second input meeting or exceeding the second predefined input threshold.

3. The method of claim 2, wherein the first predefined input threshold and the second predefined input threshold are time dependent.

4. The method of claim 2, further comprising determining if a combination of the first input and the second input falsely indicates the intrusion activity by comparing the first input and the second input to predefined false alarm thresholds.

5. The method of claim 4, further comprising:
recording in real-time a sensor input associated with a false alarm intrusion event; and
storing the sensor input as a false alarm threshold at the first sensor node.

6. The method of claim 1, wherein the wirelessly communicating an indication of the intrusion activity to a gateway device comprises transmitting the indication of the intrusion activity via a plurality of single communication hops over a plurality of sensor nodes.

7. The method of claim 6, wherein the transmitting the indication of the intrusion activity via a plurality of single communication hops over a plurality of sensor nodes comprises transmitting the indication of the intrusion activity via a plurality of distinct paths between the first sensor node and the gateway device.

8. The method of claim 1, wherein the first sensor node comprises a memory that stores a plurality of possible intrusion activities and a plurality of predefined input thresholds associated with the respective intrusion activities.

9. The method of claim 1, further comprising receiving at the first sensor node a user input from the gateway device regarding a network or sensor setting change.

10. The method of claim 1, further comprising using inputs from different types of sensors to discriminate between intrusion activities and non-intrusion activities.

11. The method of claim 1, further comprising:
automatically detecting a change in location of a sensor node in the wireless ad hoc network;
transmitting an updated location of the sensor node; and
altering a sensing zone of the wire less ad hoc network based on the updated location.

12. The method of claim 1, further comprising confirming existence of the intrusion activity using an input from a second sensor different from the first sensor.

13. A sensor network comprising:
a first sensor node including a first sensor and a second sensor, wherein the first sensor is separate from and external to the second sensor;
a second sensor node wirelessly coupled to the first sensor node within a wireless ad hoc network, wherein the second sensor node includes a third sensor; and
a gateway device wirelessly coupled via the wireless ad hoc network to the first sensor node and the second sensor node, wherein the gateway device comprises an interface between the wireless ad hoc sensor network and a user-interactive system configured to monitor the wireless ad hoc sensor network;
wherein the first sensor node is configured to receive a first input from the first sensor and a second input from the second sensor, compare the first input to a first predefined input threshold associated with an intrusion activity, compare the second input to a second predefined input threshold associated with the intrusion activity, and wirelessly communicate an indication of the intrusion activity to the gateway device via the second sensor node.

14. The sensor network of claim 13, wherein the first sensor node is further configured to determine an existence of the intrusion activity in response to both the first input meeting or exceeding the first predefined input threshold and the second input meeting or exceeding the second predefined input threshold.

15. The sensor network of claim 14, wherein the first sensor node is further configured to determine if a combination of the first input and the second input falsely indicates the intrusion activity by comparing the first input and the second input to predefined false alarm thresholds.

16. The sensor network of claim 13, further comprising a plurality of additional sensor nodes, wherein the first sensor node is further configured to wirelessly communicate the indication of the intrusion activity to the gateway device via a plurality of single communication hops over the plurality of additional sensor nodes.

17. The sensor network of claim 16, wherein the first sensor node is further configured to transmit the indication of the intrusion activity via a plurality of distinct paths over the wireless ad hoc network between the first sensor node and the gateway device.

18. The sensor network of claim 13, wherein the first sensor node comprises a memory configured to store a plurality of possible intrusion activities and a plurality of predefined input thresholds associated with the respective intrusion activities.

19. The sensor network of claim 13, wherein the gateway is further configured to initiate an action in response to receiving the indication of the intrusion activity.

20. The sensor network of claim 13, wherein the first sensor comprises an accelerometer configured to sense acceleration forces in three respective axes, and wherein the first sensor node is configured to distinguish between the intrusion activity and a false intrusion activity based on the acceleration forces sensed in the three respective axes.

21. The sensor network of claim 13, wherein the gateway device is further configured to cause display of a graphical user interface depicting a site-specific graphic showing locations of the first sensor node and the second sensor node and further showing respective sensing regions of the sensor network associated with the first sensor node and the second sensor node.

22. The sensor network of claim 13, wherein the first sensor comprises a volumetric sensor.

* * * * *

UNITED STATES PATENT AND TRADEMARK OFFICE
CERTIFICATE OF CORRECTION

| | |
|---|---|
| PATENT NO. | : 8,710,983 B2 |
| APPLICATION NO. | : 13/888316 |
| DATED | : April 29, 2014 |
| INVENTOR(S) | : Bernard M. Malkowski |

It is certified that error appears in the above-identified patent and that said Letters Patent is hereby corrected as shown below:

In the Claims:

Column 18, Claim 1, line 56, replace the single letter "o" with the word --to--.

Column 19, Claim 11, line 41, replace the words "wire less" with the word --wireless--.

Signed and Sealed this
Tenth Day of February, 2015

Michelle K. Lee
*Deputy Director of the United States Patent and Trademark Office*